Patented Apr. 8, 1941

2,237,295

UNITED STATES PATENT OFFICE 2,237,295

FIBER AND PROCESS OF EXTRACTING THE SAME

Edwin Horace Akin, Austin, Tex.

No Drawing. Application July 29, 1938,
Serial No. 222,067

9 Claims. (Cl. 92—7)

This invention relates to a fiber derivative and the process of extracting the same from plant products, having for its object to provide a novel fiber structure and a process of obtaining the same which are respectively more useful and less costly to carry out than those heretofore proposed. More specifically, the object of this invention is to so remove the pulpy constituents of the stems of cactaceous plants as to preserve intact the ligneous (woody) skeleton.

With these and other objects in view the invention resides in the particular fiber structure as well as in the novel steps and combinations of steps constituting the process of its extraction, which will be disclosed more fully hereinafter and particularly pointed out in the claims.

This application constitutes a refiling of, and a continuation in part of the invention disclosed in, my copending application for Letters Patent of the United States filed March 4, 1936 under the Serial No. 67,165 and entitled Fiber and process of extracting the same.

This invention has to deal with a new material, the same being a fiber structure, fibro-vascular bundles, or filaments, having the peculiar characteristics incident to their maintaining essentially the same physical form or a structure which they had in nature, and which are obtained from certain plants roughly classifiable into two classes or groups of species of the genus of cactus. Of these two classes or groups of species of cactus, one class or group comprises those members of the cactus family having relatively round or oval flat joints which inherently have a ligneous (woody) skeleton or fiber structure which is lace-like in its physical formation, the exterior surfaces of said joints being usually though not always covered with spines from which fact many of the above described flat-jointed species have derived, chiefly from the layman, the name "prickly pear," whereas all of the above mentioned flat-jointed species are known to the scientist as the flat-jointed Opuntias.

The second class or group of species comprises those plant members of the cactus family which inherently have a usually tuberculated, terete or cylindrical fiber structure or skeleton of a ligneous or woody nature and which skeleton is perforated or reticulated in physical formation. The outer surfaces of the plants of this group are also usually covered with spines, and these plants are commonly referred to by scientists as a species of the cactus family whose joints are terete, or cylindrical to globose, the stalks also being commonly referred to as joints.

Because of the characteristics imparted to the skeleton fibro-vascular structure by the process hereinafter described, there are conceivable numerous articles that may be manufactured from both the fiber structure that is lace-like in its physical properties and formation, and from the fiber structure which resembles a reticulated or perforated hollow cane or tube, of which the mention of a few here will suffice. From the former is conceived the possibility of the manufacture of such articles as lace, veils, ornamental fans, doilies, women's hand bags, baskets, etc., and from the latter can be made such articles as swagger sticks, batons, walking canes, and articles of furniture such as hall trees, trunks of floor lamps, chair legs, and as more ornamental material for use in wicker work, etc. Therefore it is apparent that the principal object of this invention is to produce or extract, from the joints of the above described members of the cactus family, the respective lignin bonded skeleton-like fiber structures, fibro-vascular bundles, or filaments, presenting on the one hand a cohered fiber structure entity that is lace-like in its physical formation, and presenting on the other hand a woody cohered fiber structure entity resembling a reticulated hollow tube, constituting a new material or materials of manufacture which afford the basis for the manufacture or fabrication of such articles as those set forth above, or other of similar character.

The flat and/or terete joints and stalks are cut off with a suitable cutting instrument, gathered and, preferably while still in the raw or green state, are treated to loosen the pulp from the fiber. While there are numerous methods conceivable for accomplishing this purpose, the treatment which is preferred because of its cheapness and simplicity consists in placing these joints or stalks in a vessel provided with openings for charging the material thereinto, a steam tight cover, openings for introducing a supply of steam if desired, optional means for drawing off the condensation of the steam, a relief valve if found necessary to limit the upper pressure, a supply of plain water and/or steam, and when water alone is used a possible means of maintaining a liquid level in the vessel. The vessel is preferably charged with water to about one fifth its capacity if water is to be used for generating the steam therein. In such a vessel the joints and/or stalks are subjected to pressure ranging from about ten to twenty pounds, preferably about fifteen pounds depending upon the toughness of the joints, and are subjected to corresponding temperatures varying from about 240° F. to about 260° F. preferably about 250° F. likewise depending upon the toughness of the joints. Inasmuch as the action of water and steam have nearly the same effect upon the joints, it matters little whether or not the joints are submerged in the water, and therefore it is mostly a matter of choice whether or not the joints are supported on a false bottom in the vessel so that any liquid in the vessel will be below said false bottom. Therefore it is contemplated supporting the plant joints in a wire basket or the like, so that their position may be regulated in the vessel above a liquid level, and also to facilitate the insertion and withdrawal of the joints from said vessel.

An alternative to the manner of treatment at this stage of the process consists in boiling the joints in a convenient amount of plain water in an open or substantially open vessel at atmospheric pressure from about two to four hours depending upon the toughness of the joints.

As a further alternative, the joints may be submerged in either running or stagnant water (at atmospheric or comparatively high temperature) in some such manner as by laying logs over the joints or placing them in weighted crates, in this case the joints being left to ret or ferment for a period ranging from about 20 to 40 days, preferably about 30 days; in this alternative treatment, and if desirable to protect the fiber from spotting effects of the rays of the sun, the joints may be covered with straw or some other covering.

Apparently many other chemical solutions than those specifically mentioned below can be used successfully so long as such solutions are strong enough to loosen the pulp from the fiber structure and yet not so strong that they will damage the latter, to the end that the fiber skeleton will be left in its original and natural formation. However, it is believed that the chemicals below described will be found to be representative of all chemical solvents.

An analysis of such plants as cactus, both cylindropuntias and platyopuntias, reveals them to contain calcium oxalate, sugars, dextrins, starches, glucosides, fats, gums, resins, lignin, cellulose, and proteins.

The constituent most resistive to chemical treatment by virtue of its inherent properties and its position as the outer coating, making up the rind, may be dissolved by certain chemicals. Among chemicals found expedient in this step are formic acid and hydrochloric acid, as described below.

Because of the irritating effect of the fumes, it is found preferable to carry out this step of the process in an apparatus involving the principle of the well known Soxhlet extractor. In such an apparatus formic acid, of about 25% strength, is placed in the bottom container and preferably heated. The acid fumes rise and are led through a closed conduit into the upper region of the chamber containing the cactus to be treated, and from said region the fumes pass upwardly into a condenser, the condensate returning to said chamber and acting upon the cactus and ultimately seeping back into the bottom or solvent container. This circuit is repeated in the process until the desired results are obtained, i. e. until the rind of the cactus plant has been dissolved. The use of formic acid of this strength and at a temperature of about 100.8° C. at atmospheric pressure is continued until the rind, calcium oxalate by composition, has been dissolved; this treatment requires normally about two or three hours. The time, however, will be found to vary with variables inherent in the materials to be acted upon, as above described. When about 75% formic acid is used, about one or two hours should suffice. When the acid is not heated, the process should continue at ordinary temperature for about six to eight hours, using about 90% formic acid.

While formic acid is preferred, hydrochloric acid may be used in strength of about 15 to 20% and at a temperature of about 83.1° C. at atmospheric pressure for two or three hours with applied heat, whereas without heat and at ordinary temperature at atmospheric pressure the treatment should be carried out for from about six to eight hours with the acid having a strength of about 35%.

A combination of physical and chemical operations for the disintegration of the rind may be effected wherein the action of formic acid or hydrochloric acid may be continued for only half the length of time recommended for removal of the rind by solely chemical means, the same procedure, strength, temperature, and pressure being employed.

After dissolving the calcium oxalate or rind, as above described, there are several ways in which dissolution of other constituents can be brought about to the point that, if and when required, the application of physical force will readily free the fiber structure of all other properties while preserving the fiber structure as it was naturally formed, and even enhancing such properties of said fiber structure as its lustre and strength, by removing those constituents that exercise a damaging effect to the fibrous skeletons after the plants have ceased to grow, as when they are cut or enter into a state of decomposition.

One way is by the action of formic acid, preferably about 25%, carried beyond the stage of dissolving the rind, the end being to dissolve the inherent sugars, dextrins, starches, and glucosides, using care to avoid damage to the fiber structure which, however, is practically immune to the action of formic acid, inasmuch as this acid does not readily dissolve lignin, the cementitious bond holding the fiber constituents in place, nor does this acid attack under these conditions the cellulose constituents. The time required for this treatment of constituents, other than calcium oxalate, is about forty-five minutes to one hour when heat is used. If heat is not to be used, formic acid of about 90% strength is recommended, and the time in this case should be about three to four hours.

Hydrochloric acid is not recommended at this stage of the process due to its tendency to scorch the fiber structure.

Weak solutions of bases and alkalies, preferably caustic soda, present other possible solvents for the constituents other than the fiber structures, which are left free of damage when care is used. It is better to remove the rinds of the plants as above described, although it is not absolutely necessary to do so, the principal object being the reduction of the time factor to about one-half. About a five per cent solution of caustic soda is recommended when the plants are submerged in an open vessel (or one substantially open) and brought to a boiling point at atmospheric pressure, the length of time necessary being about thirty minutes when the rinds have been removed previously, and about one hour when they have not been removed.

Another way of using caustic soda as a solvent consists in increasing the strength to about ten to twenty per cent and eliminating the application of heat, the submersion of the plants in the solvent being extended to about forty-five minutes to an hour and a half in the case of rind-removed plants, and from an hour and a half to three hours in the case of non rind-removed plants, said submersion being made at ordinary temperature and at atmospheric pressure.

A ten to fifteen per cent solution of acetic acid may be used as a neutralizer of the caustic soda, the neutralization being performed by merely rinsing the material in the acid solution for a few seconds. The solution should be kept at ordinary temperature and at atmospheric pressure.

Another way of treating the plants consists in varying the above mentioned retting processes in the following manner and in accelerating the same by the addition of chemicals, in some instances as follows.

Retting in stagnant or running water after removal of rind as above described and under the same conditions of temperature and pressure. Retting in stagnant water produces quicker results than running water, since the bacteria are not washed away, but remain to consummate the loosening of the pulp to the point of removal in about ten days when the rind has been dissolved. Otherwise, about twenty to thirty days would be required. Practical considerations, though, will determine in a given instance whether stagnant or running water shall be used.

The retting process may be further speeded up by the addition to water of fermenting aids, as follows: about five and one-third ounces of powdered diastase to about one gallon of water, giving about a five per cent solution. Diastase has the effect of converting the starch to sugar, creating a condition favorable to the action of bacteria. The retting time in this solution, of plants with rinds dissolved as above, is about seven days, whereas about twenty to thirty days are required when rinds have not been so removed previously. The conditions of temperature and pressure under which this process is to be conducted are the same as those surrounding the above retting processes, namely, at atmospheric pressure and ordinary or comparatively high temperature. In the following variations of the retting process, it is understood that the same conditions of pressure and temperature shall prevail.

The process may further be accelerated by the addition to the above solution of about one fourth of a cake of yeast to about one gallon of water, retting being accomplished in the case of rind-removed plants in about five days, and in the case of plants retaining rinds in about twenty to thirty days.

Instead of a solution of disastase, a solution of about one ounce of caripeptic liquid to about one gallon of water will ret the rind-removed plants in about six days, and the non rind-removed plants in about twenty to thirty days. A caripeptic solution of the above strength but to which has been added about one-fourth of a cake of yeast will make possible a retting time of about four or five days for rind-removed plants, and about twenty to thirty days for non rind-removed plants.

A solution of water and papaya, about five per cent strength, purchased either straight or in the form of "Tendra," obtainable at grocery stores, with or without about a fourth of a cake of yeast to about a gallon of water, produces similar results to those obtained by the caripeptic solution above described, the time element being about the same as the above.

As an alternative to the above, to about one gallon of water may be added about one and a half ounces of essence of caroid with like results.

Almost any number of combinations and permutations of the above chemicals may be made, using about 5% strength of diastase, caripeptic liquid, papaya, and essence of caroid, and about one-fourth of a cake of yeast per gallon of water, evidence pointing to the fact that results similar to those obtained above, in a like period of time, and under the same circumstances of temperature and pressure, are had.

Disintegration of the rind should precede retting in running water as well as in retting under other conditions, if time is a factor. The factor of labor, however, may offset this consideration to the point that it may not be deemed desirable. The shortening of the time factor may, however, be counterbalanced by the added cost of certain of the above chemicals. In the final analysis, therefore, conditions surrounding the extraction of fiber structures will dictate the advisability of one method over another.

As an alternative to the above, plants may be boiled in an open vessel (or in one substantially open) at atmospheric pressure in a solution containing three or four tablespoonfuls of a detergent such as "Dreft" to a gallon of water for about two or three hours, depending on the toughness of the plants.

If it is considered in given instances that subjection to further chemical treatment of fats, gums, and resins is desired, the material may be subjected to the action of any of the following— carbon disulfide, acetone, carbon tetrachloride, ethylene glycol, monomethyl ether, meta-xylene, normal-amyl acetate, glycerine, alcohol, ether, benzine, or acetic acid. In every case except that of acetic acid, the strength of these chemicals is understood to be 100%. The strength recommended for acetic acid is about ten to fifteen per cent. The time required for soaking in these chemicals is about the same for all; the length of time, being more or less arbitrary, may be determined by other practical considerations, such as variations of toughness of the plants being acted upon, about thirty minutes to an hour being suggested in some instances, although matters of expediency may render about five or ten minutes sufficient in some while in still others it will be found sufficient merely to rinse for a few seconds the residue adhering to the fiber structures. In any case, subjection of the gummy, resinous, and fatty portions of the plants to the action of the above chemicals should be carried on at ordinary temperature and at atmospheric pressure.

It is very important, in any instance of chemical treatment as described above, or in the employment of any other method of treatment found workable, that to chemical and/or physical formulas, or to combinations of these two methods of treatment, there should be added the skill of the worker in regulating the procedure, inasmuch as variables such as differences in freshness of plants, toughness, freedom from plant disease, including scar tissue, inherent differences, etc., enter to modify the adaptation of the process or processes. By careful manipulation of such processes there are assured fiber structures which are superior to those produced merely by the operation of formulas not so guided by man, as in the case of weathering.

Weathering is a process blind to the refinement resulting from the processes described herein, namely, the extraction from plants such as cactus of the fibro-vascular bundles or fiber structures while preserving them undamaged and in their natural formation. Resulting from the process of weathering are fiber structures of a grade so inferior, particularly in lustre and strength, as to render them inadequate for the uses for which the products of this invention are intended. On the other hand, skillful manipulation of the processes described in these specifications is known even to enhance upon extraction these same qualities of lustre and strength, to the end that the fiber structures are readily adaptable to the uses described herein.

As a result of the foregoing treatments, which are known in the art as "retting," and when the pulp has been sufficiently loosened from the fiber structure, the joints (flat and/or terete) are taken out of the medium designed to accomplish this purpose, and then subjected to the second stage of this process of fiber extraction namely, the separation of the fiber structure bodily from its incasement of rind and bulk of pulp. The separation may be performed mechanically and/or chemically, and will vary according to the type of cactus joint involved.

In the case of the flat joints, a simple and cheap method of mechanical or physical separation is as follows. The flat joints are laid upon a table or other convenient means of support, and while in the case of some flat joints removal of the rind is facilitated by beating with some such instrument as a paddle, this treatment preparatory to the removal of the rind is usually not necessary. Even when this stage of the treatment is dispensed with, it is sometimes advisable to scrape off the spines with an adequate knife-like instrument, since sometimes the treatment to loosen the pulp fails to disengage the hold of some of the spines from their respective bases, so that they remain embedded and are somewhat difficult to remove. In most cases, however, this positive step of spine removal is unnecessary, since with most flat joints the spines yield their hold upon their respective bases by virtue of their adherence to the rind, so that when the rind is removed the spines come with it.

The rind of most of the joints or pears at this stage of the process will yield readily so that the rind may be peeled off without further preliminary measures. For this purpose the peeling can be accomplished by hand or by pliers, tongs, or clamps fashioned so as to grip the rind over a substantial dimension of the rind. In other words, the tongs or clamps work best when they are of a length such that the jaws will be distributed over a substantial portion of the rind to create a hold thereon distributed as evenly as possible. The jaws of the clamps may if desired be perforated so as to let a portion of the pulp adhering to the rind pass through the perforations when the jaws are clamped down upon the rind, thereby intensifying the grip of the jaws upon the rind. By having the jaws coextensive at least with the breadth of the joint being operated upon, the likelihood of the rind tearing is lessened.

The removal of the rind is comparatively simple provided a good hold or grip has been obtained, therefore it is important that such a grip be provided. It has been found by experiment that the best point of the joint or pear at which to secure this hold, is at the base, but because of variation in the size, shape, thickness and toughness of the joints, no definite formula can very well be set up for securing a hold upon the rind. Often, the fingers are sufficient to pull the rind from the fiber at the base of the joint so that the rind may be gripped securely by the tongs. At other times, however, certain cuts radiating from the base along the edges of the joints assist in securing a grip, but because of the above mentioned variations in the joints, no definite cuts can be set down here as a pattern. It is usually sufficient to make cuts with a knife from the base of the joint along the edge thereof, sometimes only a few inches on each side of the base of the joint, and sometimes as far as the center of the flat joint or pear. Seldom is it advisable to cut the entire circumference of the pear and therefore judgment in this matter is largely determined by the contours of the sides of the joints since they are only approximately flat. If the contours define sufficient elevations or depressions on the surfaces of the joint, it may be advisable to cut along the edge of the joint behind such elevation or depression and pull up on the rind either with the hand or with tongs; or with such elevations or depressions it may be found advisable to cut entirely around the periphery of the elevation or the depression so that when the rind is pulled there will be a gap therein corresponding to said elevation or depression, after which the rind of each elevation or depression can be individually removed; the entire purpose of such cuts being to make the rind yield more readily and without tearing to the pull exerted upon it by the hand or the tongs. In still other instances it may be advisable to cut the rind at right angles to the line running from the base through the center of the joint to facilitate gripping with the tongs, since it is conceivable that a roll of rind might be accumulated by peeling it off before it is deemed feasible to grip the rind with the tongs.

As suggested by the foregoing, it may be advisable to use tongs with jaws or lips varying in width from jaws about the size of those of ordinary pliers, to those whose jaws are about twelve inches in width. Generally it has been found that the narrower the jaws, the easier it is to grip the rind. On the other hand, the wider the jaws (until the width of the joint is encompassed) the more evenly is distributed the pull upon the rind. Therefore it may be found convenient to use more than one set or pair of tongs, the jaws of all of the tongs so used gradually increasing in width until finally there is clamped upon the rind a set of tongs which, with a reasonable pull exerted thereupon, easily removes the rind. This stage of the process as will be readily appreciated from the foregoing, demands a certain skill and experience for the attainment of the best results, both as respects the effect upon the fiber and the amount of the yield. If the rind does not carry with it all of the spines, those spines which remain adhered to the fiber may be scraped off or disengaged in a manner as found most convenient. Removal of the rind may be assisted by the use of an instrument such as a paddle designed to serve the purposes of pressing down upon the mass of fiber and adhering material so as to hold the same in place while the rind is being removed.

Still another method of rind removal may be employed, consisting of mechanical or physical operations as by the use of some such device as a steak dicer, beating the plant with such a device, having teeth not so long that they will extend into the plant far enough to disintegrate the fiber structure and yet long enough to penetrate the rind, rendering the inclosed constituents accessible to whichever mode of treatment is preferred, whether mechanical or physical and/or chemical. In case the action to which the plant is further subjected is steam, as described above, or boiling in an open or a substantially open vessel, the time of treatment in the former instance may be reduced about fifteen minutes from the time required to treat the plant from which the rind has not been so removed, and reduced about twenty to thirty minutes in the case of the latter treatment.

Following the removal of the rind, the fiber structure with its adhering mass of pulp is laid flat upon a table or other substantial surface. By the use of a device to serve as a masher, beater, or roller presser having sufficient weight, either inherent or attached to render its performance effective, the mashing, beating, or pressing of the pulp can be carried out to further loosen it and separate it from the fiber structure. Such a device as here contemplated may consist of a surface consisting preferably of a series of parallel rods or stiff wires conveniently spaced from each other with openings therebetween ranging from about one sixteenth to about one fourth of an inch, preferably about one eighth of an inch, whereby the pressure applied by such instrument will be sufficient to disengage the pulp from the fiber, the former being reduced to a jelly-like substance. Most of this separated pulp may be scraped or otherwise removed from the fiber structure. This mashing, beating, or pressing of the pulp material can be dispensed with in a number of instances, but nevertheless it is found feasible and therefore desirable in the majority of cases.

As suggested by the foregoing description of numerous and devious ways of dissolving the pulp, after removal of the rind by treatment with steam as above described, these mechanical or physical operations consisting of mashing, beating or pressing may be dispensed with altogether and in their stead may be substituted chemical treatment as follows. The cactus joints may be subjected to one or another of the above described chemical treatments, depending upon the nature of the joints and other practical considerations, employing the same procedure in either instance as that employed in the aforementioned treatment, including the same strength, temperature, and pressure, but shortening the time to about one-fourth or one-third varying it in accordance with the prevailing circumstances.

If desired, these mechanical and/or physical operations may be conducted simultaneously with the above described chemical operations, employing the same procedure, strength, temperature, and pressure, but shortening the time even further to about one-fourth or one-third of that suggested for chemical treatment as an alternative to the mechanical or physical operations described above.

In the employment of either mechanical or physical or purely chemical operations at this stage of the process, or a combination of these two types of operations, or, in a word, in the employment of "artificial" means to loosen the pulp from the fiber structure, the exercise of care results in a fiber structure manifesting qualities of lustre, strength, and resiliency which are absent from the fiber structures yielded by the "natural" process of weathering, which qualities definitely assure the former product of the utilities previously set forth.

The next stage of the process consists in freeing the fiber structure from the remaining attached pulp, preferably employing a washing operation. This may be accomplished by placing the flat jointed fiber structures upon a foraminous screen, preferably of wire cloth made of either galvanized iron, copper, or Monel metal, though galvanized wire cloth has been found quite suitable, the meshes of such cloth varying from about two to sixteen per inch, exceptional results being obtained with a cloth of four meshes per inch so that the openings between the wires are less than one half inch, one sixteenth inch and one fourth inch respectively. Such a screen can be of varying size as from about six to eighteen feet long by three to nine feet wide, in accordance with the amount of material to be handled, and the screen is preferably stretched tight upon a frame which is preferably to be kept stationary, but which may be inclined at a convenient angle to the horizontal so that the pulp may be more readily separated from the fiber structure, an angle of about 45° being found very suitable.

Regardless of the position of the screen, a vat or tank may be placed beneath the same so as to catch the washing solution and the pulp passing therethrough, such vat being provided with a suitable trough or drain, so that the solution may be recovered if desired for reuse after the pulp has been strained therefrom.

The object of this washing as hereinbefore stated is to remove the remaining pulp from the flat jointed fiber structure and therefore the material to be washed is laid upon said screen and subjected to the action of a liquid spray or stream at ordinary temperatures, with the stream being directed approximately at right angles to the plane of the screen. The liquid may be plain water but it has been found quite desirable in many instances to use a slightly acidified water spray, or to use a caustic soda solution of about one to five per cent concentration. This washing solution is directed onto the material on the screen under a pressure ranging from about 75 to 150 pounds, the liquid being conveyed through some such conveyor as an ordinary hose to the end of which may be attached a nozzle and by means of which the stream is directed with a reasonably strong force upon the material being treated, and the stream regulated between the two aims of covering as large a surface as is possible and effectively removing from the fiber structure the remainder of the pulp still adhering thereto.

This stream of water or washing solution is directed upon the material until the remainder of the pulp is removed from the side of the material exposed to said stream. The material is then turned over so as to expose the opposite side thereof to the washing solution. To assure convenience and a saving of time in turning the material, the screen may be made of two layers of wire cloth with the material to be washed held therebetween, opposite sides of the screen being provided centrally with pivots, as will be readily understood, whereby all of the material will be turned over simultaneously by rotation of the screen frame or frames. This washing operation is continued until the lace-like fiber structure is practically entirely free of its adhering pulp. If a caustic soda solution, or acidified water solution is employed, it will be found advisable at the end of this operation to rinse the pulp freed fiber structure with plain water or a second solution to entirely neutralize the washing solution, this being done for a period of about one to three minutes.

A cheaper way of removing any remaining pulp from the fiber structure would be placing the fiber structure with adhering pulp under a water fall, about three or four feet below the upper level, taking care to place the flat joints on a screen or some such device so as to prevent twisting or tearing of the lace by the force of the falling stream or current, varying the distance of the screen below the upper level of water to suit the immediate problem in hand. The flat joints should lie in a plane roughly at right angles to the fall or flow of the current. The cylindrical joints should be positioned so as to expose the maximum surface to the current or fall, which position would be approximately horizontal. However, this position may be varied in the event there should appear to be an advantage in so doing. The relative position of the flat joints may also be varied under the same consideration.

Although it is seldom necessary to do so, in the case of those joints of which the fiber had been insufficiently loosened during the first stage of this process, it may be found expedient to subject such exceptional joints to a further boiling treatment to free the pulp in one of the ways hereinbefore described. That is to say such joints can be replaced in the vessel having a steam tight cover and resubjected to the aforementioned treatment, only this time for a shorter period, ranging from about five to thirty minutes, at the end of which time the pulp will be found sufficiently loosened from the fiber so that its removal by the above mentioned washing solution will be accomplished. In rare cases an alternative method would be soaking such an exceptional joint in any of the solvents hereinbefore mentioned for chemical treatment employed for rind removal, using the same procedure, strength, temperature and pressure as previously suggested and continuing such soaking for about five to fifteen minutes, or until the fiber will yield the remainder of pulp adhering thereto upon the above mentioned washing step. Should, after such treatment, there remain mixed with the lace-like fiber structure one or more husk-like growths, they should be removed by hand or by any suitable mechanical means.

The lace-like fiber structure thus produced is then placed in the open air for drying, preferably in the sun which exercises a bleaching effect and also has the effect of toughening said structure, after which the fiber structures will be found well adapted to serve as a new material from which may be manufactured such articles as those mentioned above.

This lace-like fiber structure is sufficiently lustrous that it takes a polish readily. It is often desired, however, to retain the effect given it by the above process of extraction, which is an addition to that found in the green plant and which is incomparably superior to that of the fiber structure produced by weathering. Also, the strength and resilience of the treated product is far superior to that of the weathered product. The treated product presents a design which is intact and not torn or damaged. By virtue of the exercise of care, its qualities are even enhanced by skillful treatment, as above stated. The weathered product, however, is seldom found to preserve the original or natural design, the pattern in many instances having rotted away by the time it is found. Also in the case of the weathered product, the fiber structure is often found to be not free of decayed rind or other adhering substances, the removal of which is envisioned by the artificial process hereinbefore described.

The terete or cylindrical joints are initially treated in a somewhat similar manner. That is, they are gathered and subjected to a boiling and/or chemical action as heretofore described to loosen the pulp from the woody fiber structure, after which they are subjected to a scraping action for removing the outer rind and some of the pulp. For this purpose a scraper consisting of one or more edges and constructed preferably of steel is employed, either the joint or the scraper being held stationary while the other is moved thereover, preferably in an oscillatory movement. A single edged scraper may be moved back and forth over the stationarily held joint. With increased skill of the operator it will soon be found that a scraper having plural scraping edges can be advantageously used to speed the operation of removing the rind, or outer casing.

After the removal of the rind, the next step consists in the removal of the major part of the pulp within the hollow portion of the tube-like fiber structure. While there are numerous methods for accomplishing this, the method preferred consists in the use of an instrument in the nature of a "rammer" which can be worked back and forth within the tube-like structure, or held stationary while the tube-like structure is worked back and forth upon it. This rammer is a rod-like instrument designed of a size to fit the tube-like structure reasonably well, is preferably made of steel, and should have sufficient elasticity to permit slight bending to accommodate any curvature in the fibrous tube-like structure. Instead of a single ordinary rod, this rammer could comprise two high tensile metallic wires intertwisted with suitable bristles, or a flexible coil of metallic wire might be used, the principal purpose of this rammer being to quickly remove or push the bulk of the loosened pulp from within the tube-like fiber structure, some of the pulp by this action being dispersed laterally through the reticulated openings in the wall of the woody structure, while another quantity thereof is extruded from the ends of the joint. It may be desirable to use a series of rammers varying in diameter the smallest being inserted first, or to use a single rammer having diameters of graduated dimension with the smallest applied first to the joint from which the pulp is to be pushed.

These rammers may be of any suitable length ranging from about four to one hundred feet with operating sections spaced from about six inches to three feet apart, preferably about one foot apart, whereby such a rammer could be encompassed by one or more tube-like woody fiber structures or joints. Relative movement between said joints and the rammer will effect a removal of the bulk of the pulp from within the joint. The pulp thus extruded either at the ends of each joint or from the reticulated openings in the wall of the woody structure may be wiped or scraped off by hand or with such a scraper as above described.

The walls of the hollow reticulated tube-like woody fiber structures are then freed from the remainder of pulp preferably by brushing. A brush is recommended for this purpose consisting of bristles of stiff hair or very thin metallic wire, twisted between two high tensile wires, the brush elements being disposed longitudinally of the brush for a distance from about three to eighteen inches in the case of a short single or unitary brush, the bristles extending substantially radially from the brush axis a distance in accordance with the internal diameter of the joints. The wire so used should be treated, preferably galvanized, and exceptional results have been obtained with bristles of wild boar. This brushing is accomplished by relative movement between the brush and the woody fiber structure and, as was the case with the rammer, the brush may be an instrument of a multiple or gang type varying in length from about four to one hundred feet, the brush elements being similarly spaced from each other as were the elements of the rammer, whereby a large plurality of plant joints may be operated upon simultaneously. The bristles of a single or unitary brush may vary slightly as to their radial extent, or several unitary brushes may be provided each having bristles of a radial extent different from another brush, and further the bristle elements on an elongated "brusher" may vary in diameter, the purpose of all brushes being to accommodate joints of different sizes, which joints vary in internal diameter of the woody structure from about one sixteenth of an inch to one inch, the effective brush elements being those whose diameter is slightly larger than the internal diameter of the joint being brushed.

It has further been found that the brushing can be effectively done while the joints are submerged in either plain water or a slightly acidified water solution, or a caustic soda solution of preferably one per cent concentration, or denatured alcohol, at ordinary temperatures. Plain water for cheapness is to be preferred, but the liquid to be used will depend upon the tenacity of the pulp in the center of the terete joints, and/or the degree of softness of the pulp as a result of the initial boiling step of this process. In other words, with some joints it may be found practical to prolong the boiling stage to positively soften and loosen the pulp to that degree where relatively little brushing will be required to remove the pulp from within the joint, whereas in other cases it may be found more practical to limit the length of time that the joints are boiled in the initial step but to increase the severity of the brushing step by the use of an acidified water solution or the caustic soda solution; this is a matter of operating expediency. When the brushing is done while the joint is submerged in a solution other than plain water, only a few seconds of time should be necessary with fairly rapid oscillation of the brush with respect to the joint. The all important feature of this process is to maintain the initial physical characteristics of the fiber structure or, in other words, to so conduct the process of separating the pulp from the fiber that the lignin and most of the other natural cementitious binders adhering the fibrillae together will not be dissolved and/or removed, to the end that the fibrillae remain adhered to each other wherefore the fiber bundles or fibrovascular structure remains intact substantially as it was in nature.

The brushing may be accomplished alternately in the air and in the liquid, preferably when using the liquid merely dipping the plant joint for a few seconds of time together with its contained brush, and oscillating one with respect to the other while so submerged.

The remainder of pulp on the exterior surface of the fibrous tube is then removed although obviously this could be accomplished prior to the removal of the remainder of the pulp from the inner walls of the tube. The removal of the external pulp is preferably accomplished also by brushing but the brush for this purpose is designed so as to fit about the outer portion of the fibrous tube sufficiently closely to brush its surface in an efficient manner. Inasmuch as the outside diameters of these tubes or joints also vary, and inasmuch as it is preferred to use a brush which may remain in contact with the outer surface of the tube, this brush is formed coiled in the shape of a spiral so as to have substantially a hollow central region through which the fibrous tube may be inserted and oscillated lengthwise. Also, because of the variance in the outer diameters of the joints, and because the brush bristles are desired pressed against the walls sufficiently to remove the remainder of pulp adhering thereto, and yet not pressing so hard as to obstruct unduly the insertion of the plant joint or tube into the hollow of said brush, the diameters of the hollows in said brush may vary due to an irregular formation of the spiral coil of which the brush is made.

In this brush also, wild boar bristles are preferred though bristles of metallic wire can be used, said bristles supported by two intertwisted wires of high tensile strength, as was the case in the preferred form of brush for use within the fibrous tube. The outside brush will of course be considerably less in length than the inside brush because the plant joint or fibrous tube is of relatively short length and must be held by some means while the outside brush is manipulated. It is conceivable however that the fibrous tube could be oscillated while the outside brush was held stationary. Such a brush may be provided with a handle at one end or handles at both ends, or with one or two handles placed laterally of the axis of the hollow portion of the brush, as found most convenient for operation. Furthermore, the same or similar mode of treatment for the exterior pulp may be used as explained above for the removal of the interior pulp, namely, the use of plain water, an acidified water solution, denatured alcohol, or caustic soda solution with or without submergence of the tube while being exteriorly brushed. Lastly, a scraping of the exterior portion of the fibrous tubes with a knife, knives or steel wool, may be resorted to for removing any remaining pulp-like material not removable by the brush.

It is conceivable that cases might arise though very seldom wherein certain terete joints or stalks have not had their fiber structures sufficiently loosened from the pulp to permit of their yielding the pulp readily, in which cases it may be desirable to make provision for further subjecting said joints to one of the methods for loosening the pulp described hereinbefore, preferably subjecting them to boiling under pressure for a shorter period of time than was done initially, varying this second boiling from about five to thirty minutes. An alternative to this would be to submerge such joints in denatured alcohol or in a caustic soda solution at ordinary temperatures, solutions as hereinbefore mentioned, for about five to fifteen minutes, repeating this operation until the fiber structure yields the remainder of its pulp. After this further boiling or other treatment, the process of extraction heretofore stated is resumed.

As in the case of the flat joints, so in the case of the cylindrical joints, chemical treatment alone will suffice, to loosen the pulp at this stage of the process, the same procedure, strength, temperature, pressure and time element holding here as obtained in the case of corresponding treatment of the flat joints. Also, as in the case of the flat joints, it may be deemed advisable to combine mechanical or physical operations, such as brushing, with chemical operations, the same procedure, strength, temperature, pressure, and time prevailing here as prevailed in the case of combining these two types of treatment at the corresponding stage of treatment and/or removal of pulp from the flat jointed fiber structures.

Essentially the same differences are discernible between the above artificially extracted terete or cholla cactus fiber structures and those produced by weathering as were noted between artificially produced flat-jointed fiber structures and fiber structures produced by weathering, with corresponding inadaptability of the weathered skeletons to the uses intended for the cholla cactus fiber skeletons as produced artificially by this invention.

The woody tube-like fiber structures thus obtained are then placed in the open air, preferably in the sun, to bleach and toughen the same, where they are left until dry, whereupon it will be found that there results a strong, woody fibrous material in the shape of a tube containing a hollow center, with the walls of the tube reticulated or perforated, and from which material may be manufactured such articles as those enumerated above.

If desired, these fiber structures, both those that are extracted from the flat joints and those that are extracted from the terete or cylindrical joints, may be washed in benzene or denatured alcohol, preferably performed by submerging and agitating them in denatured alcohol for a period of time of from only a few seconds to about two or three minutes, preferably about one-half minute, said agitation being performed either by hand or by mechanical means. This washing operation, if or when performed, should preferably be carried out just before setting the fiber structures in the sun to dry and bleach, and is for the principal purpose of dissolving any remnant of pulp that might still adhere to the fiber structure.

In connection with the terete form of cactus joint or stalk, it will be appreciated that some may be desired having such a small diameter that it might be practically impossible to insert a rammer or brush within the natural hollow portion thereof to remove the pulp, and when this is the case it may be found sufficient for the purpose desired to use brushes alone on the exterior of these joints, using a small brush that could enter the reticulations or indentations in the side walls, and/or subjecting such small joints to the chemical solvents disclosed in connection with the treatment of the flat and larger terete jointed cacti for loosening the pulp, using the same procedure, strength, temperature, pressure, and time element as previously mentioned. After such loosening, a considerable quantity of the pulp may be removed by washing in a strong current of water or blowing with air under pressure. Any pulp remaining within the hollow of such joints would be of such small amount that it would not be detrimental in any way to the fiber structure sought.

It will be observed that in artificially extracting the terete fiber structures, as in extracting the flat-jointed fiber structures, there is ever present, regardless of which devious process may be used, the constant vigilance of the skilled worker to the end that effects harmful to the reculting fiber structures will be warded off or avoided, and also and more positively to the end that there may be imparted to said fiber structures qualities which are superior to those discernible in the green plants before the process of artificial extraction was begun, and furthermore to the end that these fibro-vascular bundles or fiber structures may be extracted intact, without destruction to the wholeness or unity of design, and even further to the end that all substances foreign to said fiber structures may be removed, thus serving to preserve said fiber structures against rotting. As a consequence of this carefully planned and skillfully executed artificial process of extraction, the fiber structures produced are strong and beautiful, having a high degree of lustre and a maximum of strength and resiliency. They are capable of taking a high polish, and are at once adaptable to the uses listed hereinbefore.

The fiber structures which result from natural weathering and/or rotting have been so touched by processes of decay themselves that, although they have been able to survive the other or most of the other constituents of the original green plant, they do not survive without having been so impaired or so damaged, in lustre, strength, and resilience, that they cannot be adapted to the uses intended for the artificially treated fiber structures. Weathering involves essentially a blindness to and heedlessness of the main purpose of this invention namely, the careful preservation of and even the enhancement of the qualities inherent in the fiber structure as it grows in the green plant, wherefore weathering is the antithesis of this artificial process. The great differences between the fiber structures resulting from weathering and from this artificial treatment, and the ineffectiveness of the former for the desired uses, clearly show the exercise of invention. It remains to mention that in many, if not most of the cases of weathering, the process of extraction goes on for many months if not years and even then rind, thorns, and alien matters are still found clinging to the skeletons, and the skeletons themselves become brittle and impaired through the action of weathering and/or rotting. In fact weathering is rotting, and therefore the cactus plant is dying or has become lifeless wherefore there is nothing present to sustain or maintain cohesion between the fibrillae and other portions of the plant. In contradistinction to this, the present invention starts with a live plant, or a plant which still contains life fluid, wherefore the fibrillae of the skeleton structure are still cohered and possess substantially the full amount of strength and other attributes that they had while the plant was growing.

Although it is difficult to give a full picture of the differences between the artificially extracted fiber structures and the weathered fiber structures, both flat-jointed and terete, short of taking one into the field and observing the weathered skeletons as they are found in their natural habitat, an attempt is made, nevertheless, to give a rough picture of these differences by referring to the results of tests of many and random specimens of both products, which tests establish the marked differences between the two products particularly with regard to lustre, strength, and resiliency.

Compression tests were made by the Texas Engineering Experiment Station of the Agricultural and Mechanical College of Texas, at College Station, Texas, upon 70 samples of cholla cactus (terete), each sample being 3½ inches long, the samples ranging in diameter from $\frac{7}{8}$ of an inch to 1⅛ inches, 40 samples being treated according to this invention, and 30 samples being of weathered cactus.

The results of these tests showed averages (in terms of the breaking load in pounds as well as the breaking pounds per square inch based on the diameters of various sizes of the samples tested) from which it was readily apparent that the artificially treated cactus has an undisputable and astonishingly higher compression strength than the weathered cactus.

Tensile strength tests were made by the United States Testing Company, Inc. of Hoboken, New Jersey, upon 12 samples of flat-jointed cactus, 6 of which had been treated according to this invention and the remaining 6 being weathered specimens, the samples in each group of 6 comparable in design to those of the other group and arranged in each group similarly from #1 to #6 in the order of coarse to delicate. From these tests it was clearly ascertained that the treated cactus has a much greater tensile strength than the weathered cactus and that the resiliency and pliability of the artificially treated fiber structure are far superior.

These tests did not take into consideration the unfeasibility of the use of weathered products commercially even if their utility could be established, due to their scarcity, which seriously limits the selection from amongst them of skeletons of proper shapes and sizes amenable to their use. Neither can these weathered fiber structures be transformed in shape, as can the artifically extracted ones, because the former are lifeless and hence too brittle to undergo such transformation without cracking.

Lustre has been previously mentioned as one of the characteristics or inherent attributes of the products resulting from this invention, and that such products have a lustre far greater than that of the weathered products is plainly discernible from the exhibits submitted herewith. In natural weathering, the fiber structure is decidedly dulled in lustre appearance due to the fact that said structure is not bared or uncovered until after a prolonged subjection thereof to the rotting or decaying action which attacks said structure, and upon becoming bared is immediately subjected to a rapid and high degree of oxidation whereas, in the artificial process according to this invention, the fiber structure is recovered in substantially its live condition and the natural lustre thereof captured, and retained forever particularly by a protective coating such as shellac, varnish or other medium.

Whereas in the extraction of fibers for other purposes than those prompting the present invention, the aim is always to produce merely the individual fibers, without thought as to the preservation of, and to say nothing of the enhancement of, the qualities of the fiber structures found in their green or live state, this invention distinguishes therefrom in that, in the artificial extraction as described above, the aim is not only to recover the fiber structures or fibro-vascular bundles in their entirety but, further, to enhance the properties of said fiber structures as possessed prior to the aforementioned artificial extraction and before death or decay has set in to destroy those properties, since said properties render the aforesaid fiber structures highly desirable for the uses such as listed hereinbefore, and without which properties the aforesaid fiber structures, both flat and terete, are useless. The qualities found in the fiber structures of both flat and terete cactus joints, while said structures are still mixed or cohered with other plant constituents, that are particularly valuable for the purposes of this invention, are those of entirety and fullness of design and freedom from the damaging effects of decay. The qualities peculiarly imparted to these same fiber structures by artificial extraction, described herein, are greatly enhanced lustre and compressive and tensile strength.

Not only are all other processes of fiber extraction indifferent to either the retention of or the enhancement of the above described qualities or properties characteristic of fiber structures of both types while in their live states, but the effect of other processes is actually to destroy even those properties found in the live state, for in the segregation or extraction of the individual fibers or fibrillae which are merely the parts of fiber structures, which parts are held together in the form of said fiber structures by a cementitious bond called lignin, this lignin or bond is destroyed. In the case of all other man-made methods of fiber extraction this lignin is destroyed deliberately, as the purpose is entirely different from that of the present invention, this purpose of others being the attainment of these fiber constituents free from all foreign matters including lignin. In other words, in all other man-made methods of extracting fiber the very thing now sought, namely, fiber structures of plants, as an entity, particularly cactus plants, are destroyed. In the case of weathering, as shown above, the effects of negligence arising from the absence of care to avoid damage to properties already found in the fiber structures in their live state, to say nothing of imparting to them other highly desirable properties, such as lustre and compressive strength, are such as to render the products of this weathering process unadaptable to the uses for which this invention is intended, uses in which there is the ability to take high polishes and dyes or to present an attractive appearance without any polish or dye, reliance being placed upon the beauty of lustre imparted to the fiber structures by the artificial means of extraction described herein, and in which entirety of design and strength are essential properties.

Availing ourselves of the concreteness of metaphor, the individual fibers or fibrillae, which are sought in all other man-made processes of extracting fiber, may be likened to bricks that have been segregated or extracted from a brick house by dissolving as with the aid of strong chemicals, or otherwise destroying the cement or mortar bonding them into the complete walls forming a brick house. This brick house, in which is preserved this cement or mortar, may be likened to the fiber structure which it is the object of this invention to produce, whether flat or terete. The fiber structures produced by weathering, on the other hand, may be likened to a ruin that may present sufficient form to indicate utility of another day, but certainly not of the present. Again, since by this invention the individual fibers or fibrillae remain still cemented together by lignin, the resultant fiber structure thus obtained may be likened to the skeleton of an animal from which all the flesh has been removed.

A further difference between this process and those heretofore known is that in the former processes the method of treatment involving the use of chemicals as reagents desinged especially to assist not only in the extraction of the individual fibers, but to dissolve the lignin and other cementitious materials occurring in nature for bonding the fibers together, has had the effect of positively weakening not only the fiber structure but the individual fibers or fibrillae as well, and has in many instances caused a discoloration of the fibers, requiring additional and positive bleaching treatment.

The present process herein disclosed obviates these detrimental features either by the use of relatively weak chemicals or by the analytical or careful application of relatively strong ones, or by the use of water alone. Water is sufficient to neutralize all of the chemicals employed above except possibly caustic soda, in which case about a five or ten per cent solution of acetic acid is recommended. In all cases it is preferable to subject the pulp freed fiber structure to a thorough washing with plain water at the end of the process prior to drying and bleaching to remove any trace of chemicals.

In the claims it is to be understood that such terms as "fiber structure" and "fibrous skeleton" refer to the cohered, intercemented and unseparated fibers of the plant, including the lignin and/or cementitious bonding substance for holding the individual fibers together. All other parts of the plant are intended to be covered by such terms or "pulp" and "pulpy constituents" thereby including the pulp-like matter surrounding the fiber structure as well as including the rind of the plant.

It is obvious that those skilled in the art may vary the steps and combinations of steps constituting this process, within the scope of this invention, and therefore it is desired not to be limited to the exact foregoing disclosure except as may be demanded by the claims.

What is claimed is:

1. The process of extracting the fibrous structure from a cactus plant to recover the fibrous skeleton of the same in its intact formation, comprising treating the plant with steam to loosen the pulp from the fiber structure, mechanically removing substantially all the loosened pulp from the fiber structure while maintaining the fiber structure intact as the skeleton of the plant, and washing the skeleton of fiber structure to free it from any remaining pulp.

2. The process of extracting the fibrous structure from a cactus plant to recover the fibrous skeleton of the same in its intact formation, comprising treating the plant with steam at substantially atmospheric pressure to loosen the pulp from the fiber structure, mechanically removing substantially all the loosened pulp from the fiber structure while maintaining the fiber structure in its interconnected and lignin cemented formation, washing the fiber structure to free it from any remaining pulp, and drying the washed structure in simulation of its formation as the skeleton of the plant.

3. The process of extracting the fibrous structure from a cactus plant to recover the fibrous skeleton of the same in its intact formation, comprising subjecting the plant to a temperature of from about 240° to 260° F. in the presence of steam for a time sufficient to loosen the pulp from the fiber structure and insufficient to break down the cementitious bond between the fibrillae of the fiber structure, stripping the outer casing from the plant so treated to reveal the combined loosened pulp and fiber structure, removing by pressure a substantial portion of the loosened pulp from the fiber structure while maintaining said structure in its entirety, and removing with attendant washing the remainder of the pulp from the fiber structure leaving said structure substantially in its natural formation.

4. The process of extracting the fibrous structure from a cactus plant to recover the fibrous skeleton of the same in its intact formation, comprising subjecting the plant to a temperature of from 240° to 260° F. in the presence of steam for a time sufficient to loosen the pulp from the fiber structure and insufficient to break down the cementitious bond between the fibrillae of the fiber structure, stripping the outer casing from the plant so treated to reveal the combined loosened pulp and fiber structure, removing by pressure a substantial portion of the loosened pulp from the fiber structure while maintaining said structure in its entirety and removing with attendant brushing and washing the remainder of the pulp from the fiber structure leaving said structure substantially in its natural formation.

5. The process of extracting the fibrous structure from a cactus plant wherein the fiber structure is inherently cohered to form a fibrous skeleton of the plant, comprising treating the plant with steam to loosen the pulp from the fiber structure, and mechanically removing substantially all the loosened pulp from the fiber structure while maintaining the fiber structure intact as the skeleton of the plant.

6. The process of extracting the fibrous structure from a cactus plant wherein the fiber structure is inherently cohered to form a fibrous skeleton of the plant, comprising treating the plant with steam to loosen the pulp from the fiber structure, and removing substantially all the loosened pulp from the fiber structure by the solvent action of a dilute acid solution while maintaining the fiber structure intact as the skeleton of the plant.

7. The process of extracting the fibrous structure from a cactus plant wherein the fiber structure is inherently cohered to form a fibrous skeleton of the plant, comprising treating the plant with steam to loosen the pulp from the fiber structure, and removing substantially all the loosened pulp from the fiber structure by the solvent action of an alcoholic solution while maintaining the fiber structure intact as the skeleton of the plant.

8. The process of extracting the fibrous structeure from a cactus plant wherein the fiber structure is inherently cohered to form a fibrous skeleton of the plant, comprising treating the plant with steam to loosen the pulp from the fiber structure, and removing substantially all the loosened pulp from the fiber structure by the solvent action of formic acid while maintaining the fiber structure intact as the skeleton of the plant.

9. A fibrous article, having a high degree of lustre, consisting of an artificially cleaned lignocellulosic skeleton of a cactus plant as herein described, said skeleton being unitarily cohered and retaining its natural characteristics of resilience and compressive strength substantially unimpaired, and having the additional property of being lustrous.

EDWIN HORACE AKIN.